(12) United States Patent
Haeberer et al.

(10) Patent No.: US 8,358,921 B2
(45) Date of Patent: Jan. 22, 2013

(54) HEATING KETTLE OF A REDUCING AGENT TANK

(75) Inventors: Rainer Haeberer, Bretten (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 575 days.

(21) Appl. No.: 12/600,168

(22) PCT Filed: Apr. 30, 2008

(86) PCT No.: PCT/EP2008/055297
§ 371 (c)(1),
(2), (4) Date: Nov. 13, 2009

(87) PCT Pub. No.: WO2008/138757
PCT Pub. Date: Nov. 20, 2008

(65) Prior Publication Data
US 2010/0303453 A1 Dec. 2, 2010

(30) Foreign Application Priority Data
May 14, 2007 (DE) .......................... 10 2007 022 585

(51) Int. Cl.
*F24H 1/18* (2006.01)
(52) U.S. Cl. ......................................... 392/449; 99/380
(58) Field of Classification Search ................ 99/380, 99/381–384, 372, 430–439; 249/160–172; 425/408–425
See application file for complete search history.

(56) References Cited

U.S. PATENT DOCUMENTS

| | | | |
|---|---|---|---|
| 4,679,580 A | 7/1987 | Devall et al. | |
| 5,228,934 A * | 7/1993 | Weder et al. | 156/227 |
| 6,357,618 B1 | 3/2002 | Kloess et al. | |
| 6,595,114 B1 * | 7/2003 | Endres et al. | 99/342 |
| 6,776,085 B1 * | 8/2004 | Tang | 99/375 |
| 6,860,191 B2 * | 3/2005 | Jackson et al. | 99/340 |
| 7,735,416 B2 * | 6/2010 | Ekberg | 99/380 |
| 7,963,215 B2 * | 6/2011 | Ho et al. | 99/377 |
| 8,109,206 B2 * | 2/2012 | Rosset et al. | 99/375 |
| 2004/0001769 A1 | 1/2004 | Kempfer et al. | |
| 2007/0157602 A1 | 7/2007 | Gschwind | |

FOREIGN PATENT DOCUMENTS

| | | |
|---|---|---|
| DE | 19938131 A1 | 3/2001 |
| DE | 202006010615 U1 | 10/2006 |
| DE | 102005030954 A1 | 1/2007 |
| GB | 2390234 A | 12/2003 |

* cited by examiner

*Primary Examiner* — Thor Campbell
(74) *Attorney, Agent, or Firm* — Michael Best & Friedrich LLP

(57) ABSTRACT

The invention relates to a line feedthrough through a heating kettle cover of a heating kettle of a reducing agent tank. At least one line penetrates an opening of the heating kettle cover and is sealed by means of a sealing element. It is provided that the sealing element is configured as an elastic plug sealing stopper, which is inserted in a holder associated with the heating kettle cover in a sealing manner.

20 Claims, 6 Drawing Sheets

HEATING KETTLE OF A REDUCING AGENT TANK

CROSS-REFERENCE TO RELATED APPLICATION

This application is a 35 USC 371 application of PCT/EP2008/055297 filed on Apr. 30, 2008.

BACKGROUND OF THE INVENTION

1. Field of the Invention

The invention relates to a line feedthrough through a cover of a heating kettle of a reducing agent tank, in which at least one line penetrates an opening in the cover and is sealed off by means of a sealing element.

2. Description of the Prior Art

One known method for posttreatment of an exhaust gas from an internal combustion engine is the SCR method (selective catalytic reduction), in which the pollutant NO is reduced to $N_2$ and $H_2O$ with the aid of liquid reducing agent. The liquid reducing agent is stored in a reducing agent tank and pumped from the reducing agent tank via a hydraulic line to a metering module which adds the reducing agent in metered quantities to the exhaust gas. A slosh pot which is always filled with reducing agent is disposed in the reducing agent tank. A heater is provided in this slosh pot that serves to thaw frozen reducing agent. Because of the heater, the slosh pot is generally called a heating kettle. The heating kettle is closed by means of a cover, and the cover has an opening through which at least one hydraulic line, as described above, and/or an electric line for contacting the heater located in the heating kettle, or optionally a sensor element, is guided. Since the reducing agent system operates at a predetermined system pressure, it is necessary for the pressure to be maintained in the heating kettle as well. Among other reasons, this is why the feedthrough of the line through the cover is sealed off by means of a sealing element. It is known from the prior art to seal off a line feedthrough of this kind with a potting composition in which the line is first extended through the cover through a narrow bore, and then a reservoir surrounding the bore and embodied on the cover is filled with the liquid/viscous potting composition. Finally, the potting composition hardens and performs the sealing off of the line feedthrough. The narrow bores have the disadvantage that the line can be damaged as it is pushed through them. However, they are necessary to prevent the still-liquid potting composition from escaping from the reservoir. It is accordingly not possible for a line that is provided with a plug connection, for instance, to be extended through the cover.

SUMMARY AND ADVANTAGES OF THE INVENTION

The invention provides that the sealing element is embodied as an elastic plug sealing stopper that is plugged in sealing fashion into a receptacle associated with the cover. That is, instead of the potting composition, the plug sealing stopper is provided. As its name says, this stopper is embodied such that it can be plugged into the receptacle, and because of its elastic embodiment, a tight seat in the receptacle is assured. In contrast to the potting composition, the plug sealing stopper has a predetermined or specified shape of its own. It can be manipulated as a single element without its basic shape changing. As a result, by means of the plug sealing stopper it is possible for even relatively large openings—unlike in the prior art—to be closed tightly. As a consequence, the size of the opening to be closed is advantageously selected such that elements secured to the lines, such as plug contacts or the like, can also be passed through the opening before the opening is tightly closed by means of the plug sealing stopper. Furthermore, damage to the line on passage through the opening in the cover is prevented.

Advantageously, the receptacle is formed by the cover. The plug sealing stopper is accordingly inserted directly into the cover, and the receptacle and/or the plug sealing stopper is advantageously embodied such that once the plug sealing stopper has been inserted into the receptacle, unintentional release of the plug sealing stopper from the receptacle is prevented. For that purpose, the receptacle is advantageously embodied smaller than the "free" elastic plug sealing stopper, so that the latter on being inserted deforms elastically and is clamped/press-fitted in the receptacle.

In a further refinement of the invention, the receptacle is formed by an intermediate element that is disposed on the cover. Thus in this case the plug sealing stopper is inserted not directly into the cover but rather into the intermediate element that is disposed on the cover. The intermediate element is expediently embodied and disposed such that it covers the opening in the cover. As a result, it is possible to enlarge the opening still further, since the elastic plug sealing stopper is inserted into the intermediate element that covers the opening. As a result, large elements belonging to the applicable line can be passed through the cover along with the line.

So that the heating kettle will be tight when the intermediate element is used, a sealing means, in particular an O-ring, is advantageously disposed between the sealing element and the cover. Both the intermediate element and the opening are preferably embodied circular-cylindrically.

In a practical way, the plug sealing stopper has at least one plugging opening, in which the line is sealingly received. The plug sealing stopper thus surrounds the line, and a seal is formed between the line and the plug sealing stopper. Preferably, the plugging opening has a circular-cylindrical cross section that is embodied as smaller than the advantageously circular-cylindrical cross section of the line, so that in the vicinity of the plugging opening, the plug sealing stopper is widened elastically as the line is passed through, creating a solid and in particular tight connection between the line and the plug sealing stopper.

In an advantageous refinement, the plug sealing stopper has at least one clamping element, with which the plug sealing stopper can be secured to the line. To obtain a secure, tight connection of the plug sealing stopper and the line, it is accordingly provided here that a clamping element secures the plug sealing stopper to the line. For, that purpose, the plug sealing stopper advantageously has a thin neck region/plug sealing stopper neck surrounding the line, on which neck the clamping element is disposed, and the clamping element is advantageously embodied as a sheet-metal clamping element.

In a refinement of the invention, the plug sealing stopper is vulcanized onto the line. This assures a solid, tight connection without additional clamping means. It is also conceivable for the plug sealing stopper to be sprayed onto the line.

Preferably, the cover has at least one peripherally open, groovelike line receptacle, in which the line is located in at least some regions. This assures an advantageous guidance of the line on the cover on the one hand, and on the other, heat transported or generated by the line is output to the cover, so that in the event that a plurality of lines are located in a plurality of correspondingly embodied line receptacles in the cover, a favorable heat transfer from one line to the other is made possible.

To improve or increase the effect of the heat transfer, the line has an elastic sheath, with which the line rests, adapted in shape, in the line receptacle, so that an especially large area of contact is created between the line and the cover.

It is also advantageously provided that a holding-down device is disposed on the cover. The holding-down device can for instance be screwed to the cover or secured in some other way familiar to one skilled in the art.

In a practical way, the line is held in the line receptacle by the holding-down device. Especially preferably, the line is held in clamped fashion in the line receptacle by the holding-down device. As a result, tension relief of the line, in particular, is attained so that in the event that reducing agent located in the heating kettle freezes and the line is stressed by buckling of the ice, the line is calmed down.

Advantageously, the plug sealing stopper is acted upon by the holding-down device so that the holding-down device prevents the plug sealing stopper from being released from the receptacle. Moreover, the holding-down device can act on the plug sealing stopper in such a way that the plug sealing stopper is elastically deformed in the receptacle, so that the sealing contact of the plug sealing stopper with the receptacle and with the line is assured.

In addition or alternatively, it is provided that the intermediate element is acted upon by the holding-down device, so that the intermediate element is retained on the cover, so that the seal between the intermediate element and the cover is assured over the long term.

Finally, it is provided that the line is an electric line, in particular a heating line and/or a sensor connection line, or a hydraulic line. Especially preferably, a plurality of lines are provided, and advantageously two lines are provided as heating lines leading to a heater disposed in the heating kettle, at least one further line is provided as a sensor connection line, and at least one further line is provided as a hydraulic line for aspirating the reducing agent.

BRIEF DESCRIPTION OF THE DRAWINGS

The invention is intended to be explained in further detail below in conjunction with several drawings. For that purpose.

DESCRIPTION OF THE PREFERRED EMBODIMENTS

Figure 1:
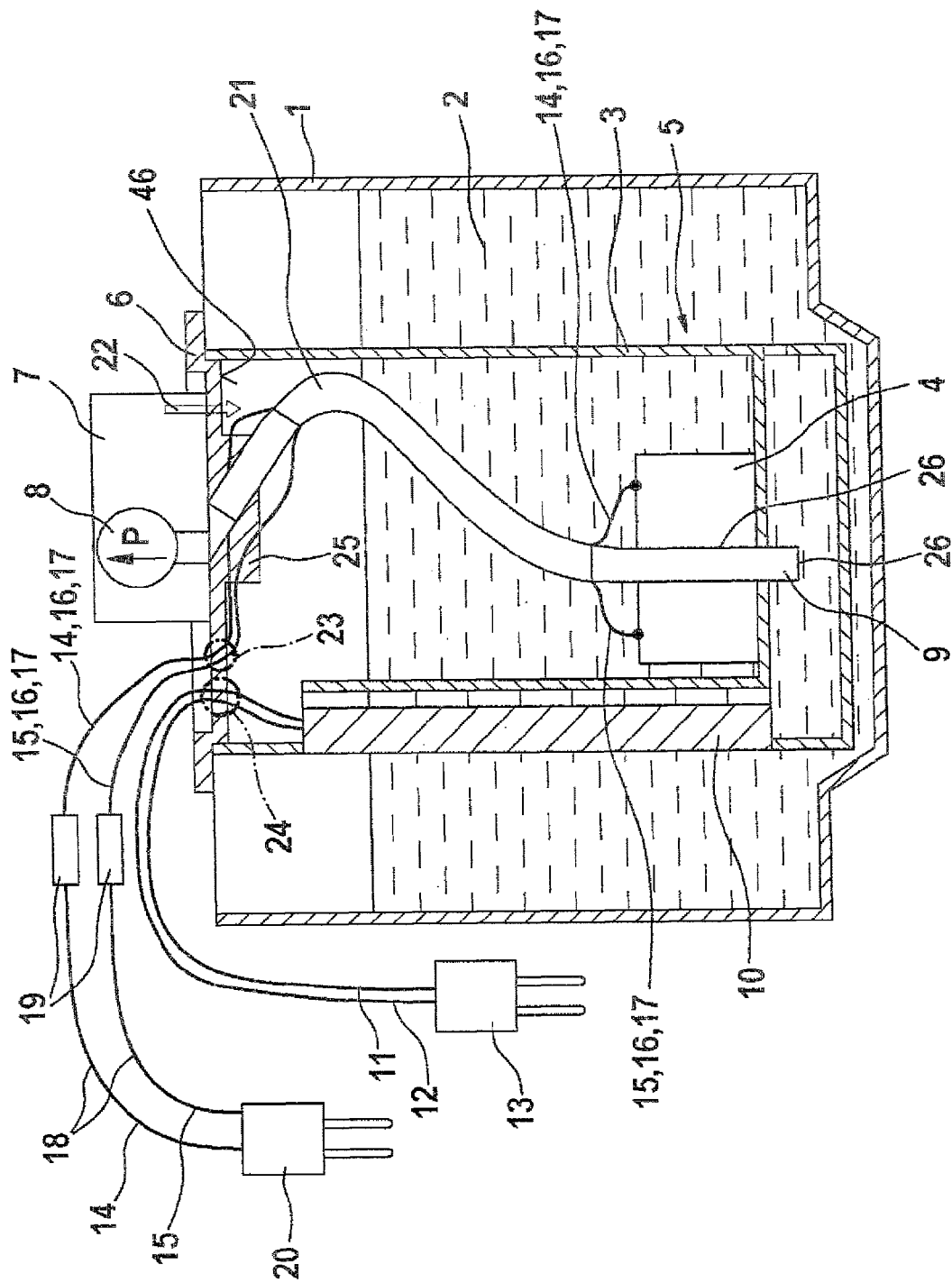
FIG. 1 shows a reducing agent tank in a schematic illustration.

FIG. 1, in a schematic illustration, shows one exemplary embodiment of a reducing agent tank 1 of an exhaust gas posttreatment system of a motor vehicle. A reducing agent 2, which is added to the exhaust gas of an internal combustion engine of the motor vehicle, is located in the reducing agent tank 1. The reducing agent system operates at a predetermined system pressure. A slosh pot 3, which is constantly filled, is disposed in the reducing agent tank 1. A heater 4 is disposed in the slosh pot 3 and serves to heat up or thaw the reducing agent 2. Because of the heater 4, the slosh pot 3 is also called a heating kettle 5. The heater 4 is disposed on the bottom of the heating kettle 5. From the upward-oriented convection of the warmed reducing agent 2 that has been thawed by the heater 4, the thawing process proceeds from the heater 4 upward to the surface. A cover 6 is disposed on the heating kettle 5 and closes off the heating kettle 5 at the top. A delivery module 7 with a reducing agent pump 8 is disposed on the cover 6. From the reducing agent pump 8, a hydraulic suction line 9 extends through the cover 6 into the heating kettle 5 and through the heater 4. A level and temperature sensor 10 is also disposed in the heating kettle 5 and serves to detect the temperature as well as the level of the reducing agent 2 in the heating kettle 5. From the level and temperature sensor 10, electric lines 11, 12 lead through the cover 6 to the outside, and the electric lines 11, 12 are connected to a plug 13. From the heater 4, two electric lines 14 and 15 lead through the cover 6. The electric lines 14, 15 are embodied as resistance wires 16 and as flexible special steel cords 17, respectively.

Outside the heating kettle 5, the electric lines 14 and 15 are extended onward as flexible copper cords 18, and each flexible special steel cord 17 is connected to a flexible copper cord 18 via a connector plug 19. The flexible copper cords 18 have a much lower electrical resistance than the flexible special steel cords 17 and therefore do not heat up during the heating. The flexible special steel cords 17 in the heating kettle 5, conversely, have a substantially better corrosion performance. The flexible copper cords 18, or the electric lines 14, 15, are connected to a connection plug 20. Inside the heating kettle 5, the electric lines 14, 15 are extended in some regions directly along the hydraulic line 9. To that end, a shrink-on hose 21 is shrunk in some regions onto the hydraulic line 9 as well as onto the electric lines 14, 15. Because of the embodiment of the electric lines 14, 15 as resistance wires 16 inside the heating kettle 5, it is assured that thawing of the frozen reducing agent 2 will occur along the respective resistance wire 16, and thus will create a communication for the liquid (reducing agent 2) already thawed around the heater 4 with the air space above the frozen reducing agent. Because the resistance lines 16 extend directly along the hydraulic line 9, the latter is advantageously thawed as well. All the lines (9, 11, 12, 14, 15) have to be extended to outside the heating kettle 5 via a tight line feedthrough. Via a path or return path 22, reducing agent 2 can be guided or returned to the heating kettle 5. Via the hydraulic line 9, reducing agent 2 can be aspirated at a plurality of suction points 26 from the reducing agent tank 1 or the heating kettle 5. The line feedthroughs 23, 24 of the electric lines 11, 12 and 14, 15 will be described in further detail below.

For sealing off an opening in the cover 6 that is normally penetrated by one of the lines (11, 12, 14, 15), it is usual first to provide the smallest possible openings, in particular narrow bores, through which the line is extended. Next, the opening is sealed off by means of a potting composition as a sealing element. However, the narrow bore has disadvantages, since the line to be passed through it, in particular the flexible copper cord 18 or flexible special steel. Furthermore, this kind of line feedthrough entails major assembly effort and expense, since first, the flexible special steel cords 17 have to be mounted on the suction line 9 by means of the shrink-on hose 21. Next, the heater is secured to the heating kettle and spray-coated with plastic. After that, the lines 11, 12 and 14, 15 are guided through the openings in the cover 6 and are sealed off by means of the potting composition. Then the flexible special steel cords 17 and flexible copper cords 18 are connected to one another, and the flexible copper cords 18 are connected to the connection plug 20. Finally, the heating air cover 6 is mounted, along with the entire heating train and the temperature and level sensor 10, in the heating kettle. Thus the assembly of the heating kettle 5 requires many different operations, which have to be performed by different specialists (company doing the assembly/manufacture).

As shown in FIG. 1, both the hydraulic line 9 and the flexible special steel cords 17 are extended through a dome 25 of the cover 6. The hydraulic line 9 expediently comprises an elastomer material and discharges into an opening embodied in the dome 25. By means of a press fit between the opening made in the dome 25 and the elastic hydraulic line 9, sealing off of the latter is accomplished. On the outside, via a sealing element not shown here, the hydraulic line 9 is extended onward into the delivery module 7. When the flexible special steel cords 17 are passed through narrow bores in the dome 25, the flexible special steel cords 17 may also become damaged at the exit points. Where the flexible special steel cord 17 exits the potting composition, damage can also occur, because the potting composition draws upward on the outside of the flexible cord sheath, and as a result in the ensuing shifting of the flexible special steel cords 17, the hard potting composition edges can cut into the flexible cord sheath. This can lead to electrical short circuits, among other effects. Moreover, the tightness of the line feedthroughs sealed off by means of potting composition must be considered critical, especially at high temperature stresses.

The following drawings show exemplary embodiments for advantageous line feedthroughs 23 of the electric lines 14, 15; it is understood that the exemplary embodiments shown and described apply to an equal extent to the electric lines 11, 12 and to the hydraulic line 9. Elements known from FIG. 1 are identified with the same reference numerals in the ensuing drawings.

Figure 2:
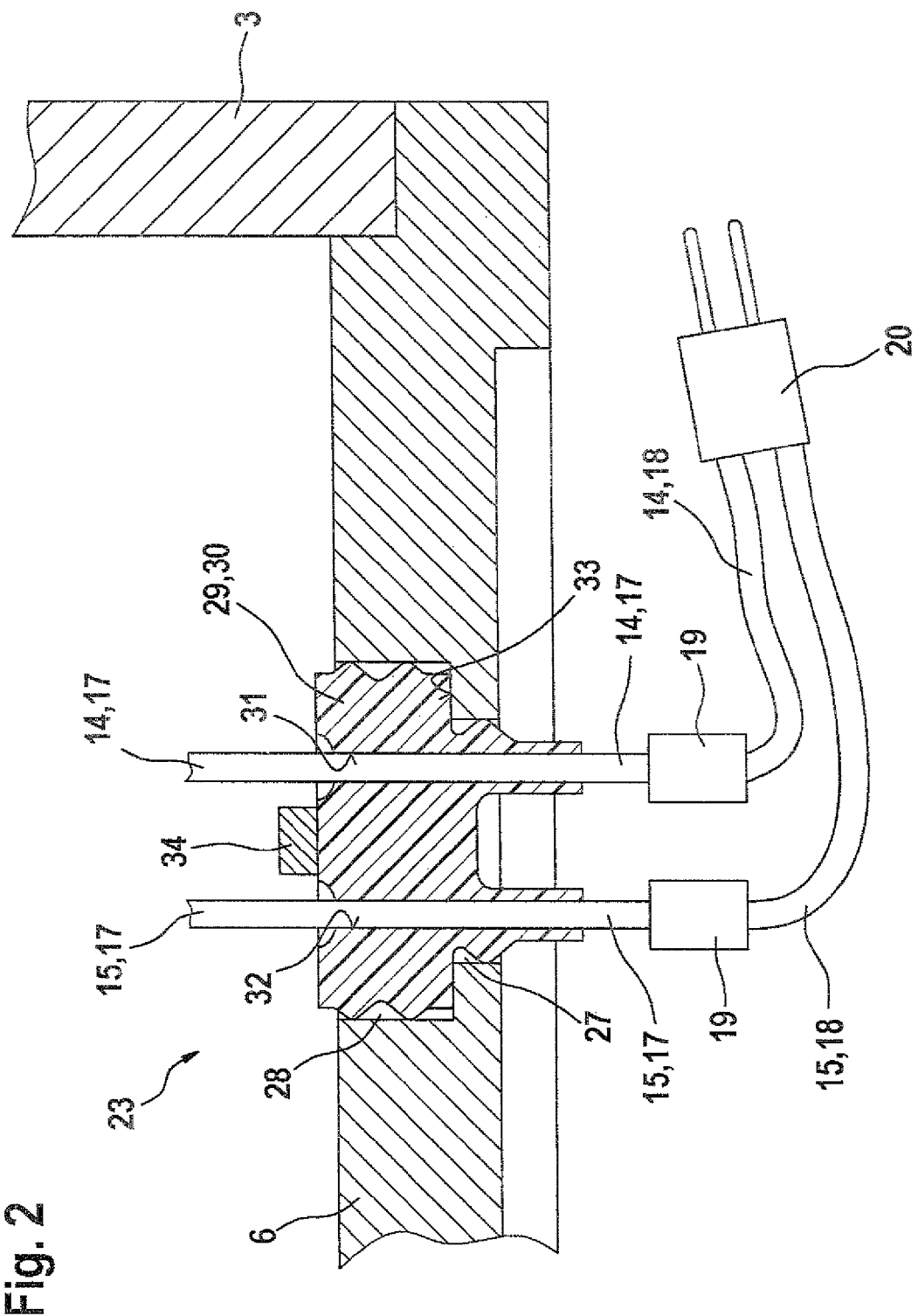
FIG. 2 shows one exemplary embodiment of an advantageous line feedthrough.

FIG. 2, in a sectional illustration, shows the cover 6 with the line feedthrough 23. The line feedthrough 23 has an opening 27, embodied in the cover 6, through which the electric lines 14, 15 are guided. A receptacle 28 that essentially surrounds the opening 27 is also made in the cover 6. A sealing element 29, which is embodied as an elastic plug sealing stopper 30, is inserted in sealing fashion into the receptacle 28. The plug sealing stopper 30 is elastically deformed in the process, in such a way that its outside rests sealingly against the inside of the receptacle 28. The plug sealing stopper has two plugging openings 31, 32, through each of which a respective electric line 14 and 15 is guided and is received in sealing fashion. The receptacle 28 has a shoulder 33, up to which the plug sealing stopper 30 is inserted. The plug sealing stopper 30 is embodied such that because of its elastic properties, it is retained in the receptacle 28. In order additionally to prevent a release of the plug sealing stopper 30 from the receptacle, a holding-down device 34 is provided, which keeps the plug sealing stopper 30 in the receptacle 28. The holding-down device 34 is for instance screwed to the cover 6. The opening 27 is embodied as large enough that the electric lines 14, 15, along with the connection plugs 19 and optionally the connection plug 20 can be passed through it. This makes it possible for the entire heating train of the heating kettle 5, that is, the heater 4, electric lines 14, 15 including the connector plug 19 and connection plug 20 can be disposed and installed in the heating kettle 5, and the electric lines 14, 15 can then be passed through the cover 6. This prevents the reducing agent tank 1 or the heating kettle 5 from having to "wander back and forth" several times for assembly between an assembly company and a manufacturer. In the assembly of the heating train, the plug sealing stopper 30 is for instance thrust onto the flexible special steel cords 17, and because of the elastic embodiment of the plug sealing stopper 30 these flexible cords are not damaged and rest tightly in the plugging openings 31, 32. Next, the flexible copper cords 18 are connected to the flexible special steel cords 17 by means of the connection plug 19. In the final assembly, all that now has to be done is for the plug sealing stopper 30 to be inserted into the receptacle 33 in the cover 6 and, as needed, for the holding-down device 34 to be installed. A tight line feedthrough 23 is thus assured, which ensures simple and economical assembly without presenting any risk of damage to the electric lines 14, 15.

Figure 3:
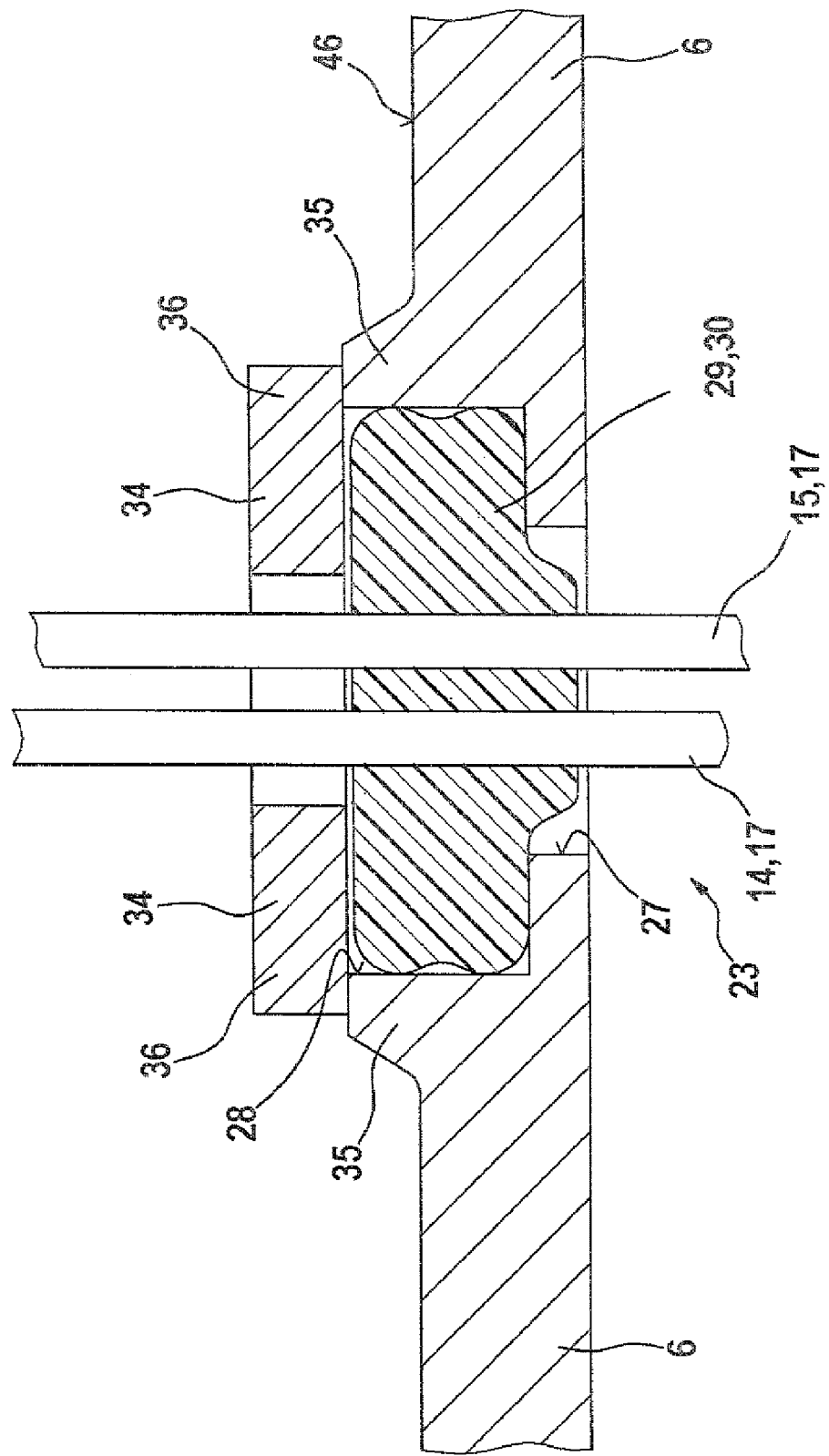
FIG. 3 shows a further exemplary embodiment of an advantageous line feedthrough.

FIG. 3 shows a further exemplary embodiment for the advantageous line feedthrough 23 in a sectional illustration. In a distinction from the exemplary embodiment of FIG. 2, the plug sealing stopper 30 is vulcanized onto the flexible special steel cords 17, so that an especially tight connection between the flexible special steel cords 17 and the plug sealing stopper 30 is assured. Furthermore, the holding-down device 34 rests on protrusions 35 of the cover 6 that define the receptacle 28 and thus prevents a release of the plug sealing stopper 30 from the receptacle 28. In contrast to the holding-down device 34 of FIG. 2, which acts upon the plug sealing stopper directly and with only one element, the holding-down device 34 in FIG. 3 has at least two elements 36, between which the flexible special steel cords 17 are passed.

Figure 4:
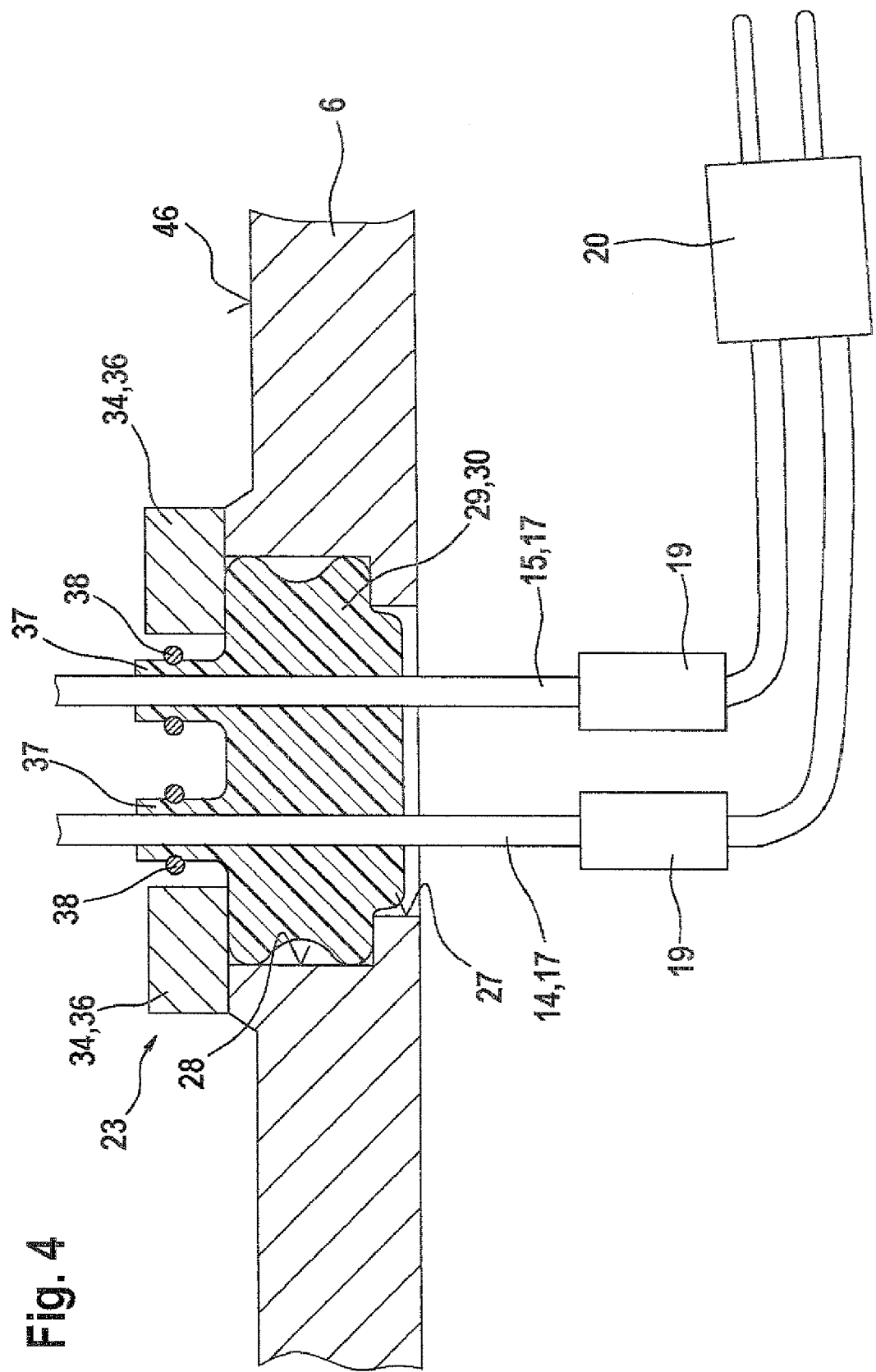
FIG. 4 shows a further exemplary embodiment of an advantageous line feedthrough.

FIG. 4 shows a further exemplary embodiment of the line feedthrough 23 in a cross section. In a distinction from the exemplary embodiment shown in FIG. 3, the plug sealing stopper 30 is not vulcanized onto the flexible special steel cords 17 but instead, as in the example in FIG. 2, is thrust onto them. The plug sealing stopper here has two protruding plug sealing stopper necks 37 each in some regions surrounding a respective flexible special steel cord 17. One clamping element 38, in particular a sheet-metal clamping element, is disposed around each of the plug sealing stopper necks 37 and by means of it, the plug sealing stopper necks 37 and thus the plug sealing stopper 30 can be secured to the flexible special steel cord 17 by clamping; the clamping elements 38 assure not only the securing but also a tight connection between the plug sealing stopper 30 and the flexible special steel cords 17.

Figure 5:
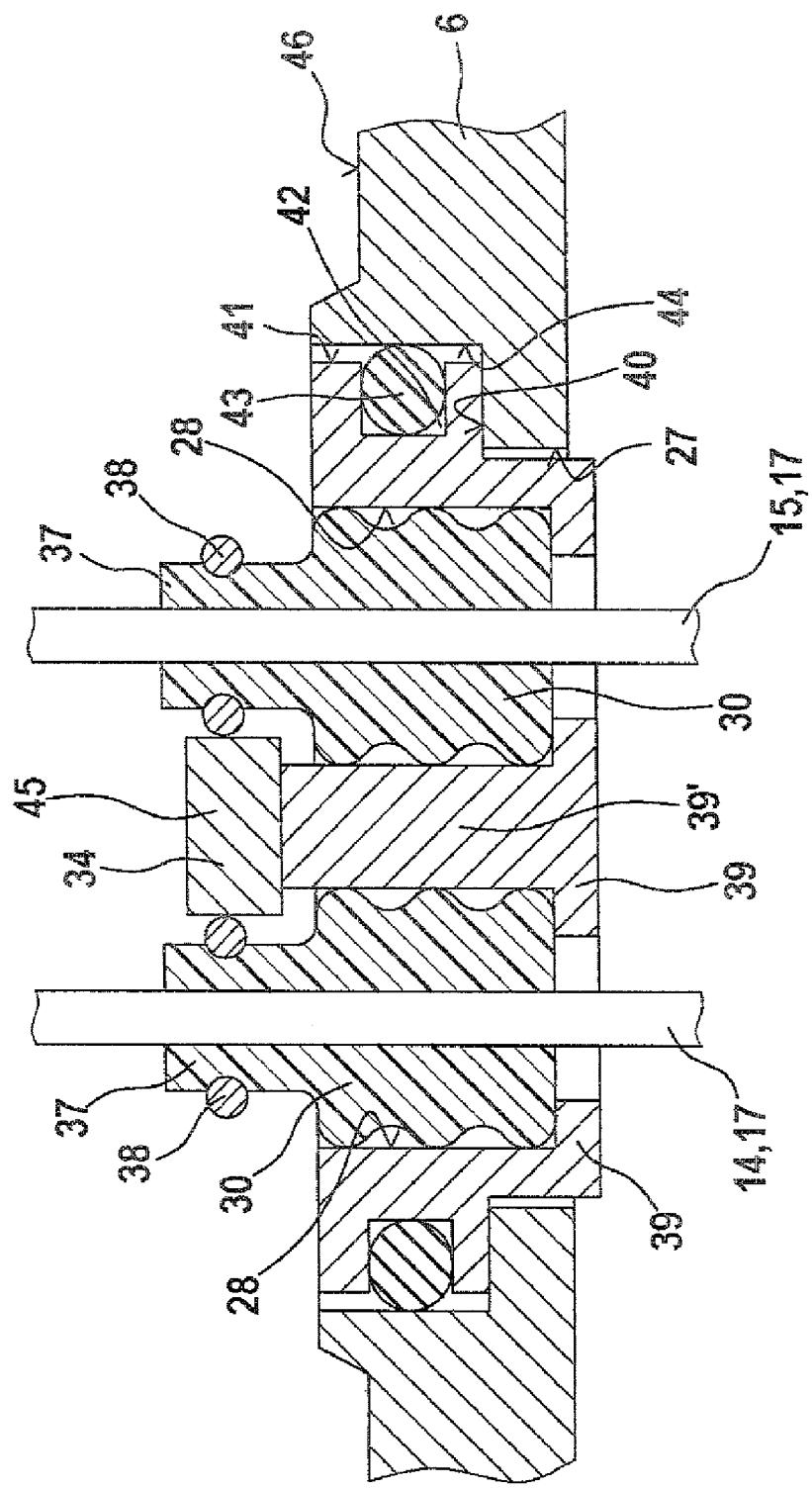
FIG. 5 shows a further exemplary embodiment of an advantageous line feedthrough.

FIG. 5 shows a further exemplary embodiment of the advantageous line feedthrough 23 in a sectional illustration. In a distinction from the exemplary embodiments of the preceding drawings, here one plug sealing stopper 30 is provided for each of the flexible special steel cords 17, and the respective receptacle 23 into which the plug sealing stoppers 30 are inserted is formed by an intermediate element 39, which is disposed at the opening 27 of the cover 6. The intermediate element 39 advantageously rests on a shoulder 40 that is formed by the cover 6. The intermediate element 39 is advantageously embodied essentially circular-cylindrically, and on its outer jacket face 41 it has a groovelike recess 42, extending over the entire circumference, in which an O-ring 43 is located as a sealing means. The O-ring 43 cooperates with an inside face 44 of the cover 6, so that sealing is assured between the intermediate element 39 and the cover 6. The plug sealing stoppers 30 are each thrust on the corresponding flexible special steel cords 17 and secured by means of the clamping element 38, as described above. The intermediate element 39 has a middle rib 39', which divides the receptacles 28 from one another. Naturally, it is also conceivable for only one receptacle 28 to be provided, as in the foregoing examples, but to be embodied in the intermediate element 39. In the present exemplary embodiment, the middle rib 39' cooperates with the holding-down device 34 in such a way that the intermediate element 39 is retained on the cover 6. The element 45 of the holding-down device 34 acting on the intermediate element 39 is embodied as so wide that it protrudes past the middle rib 39' to both sides, thus providing additional security against a release of the plug sealing stoppers 30 from the receptacles 28. The intermediate element 39 creates a possibility of making the opening 27 even larger than in the foregoing exemplary embodiments, yet nevertheless sealing off the interior of the heating kettle tightly.

Naturally, the exemplary embodiments shown in FIGS. 2 through 5 may have more or fewer electric and/or hydraulic lines that penetrate the plug sealing stopper 30 and/or the opening 27. Moreover, a combination of the above-described exemplary embodiments is also conceivable. The plug sealing stopper necks 37 can equally be embodied/oriented as protruding outward into the surroundings, instead of inward as shown in FIGS. 4 and 5.

Figure 6:
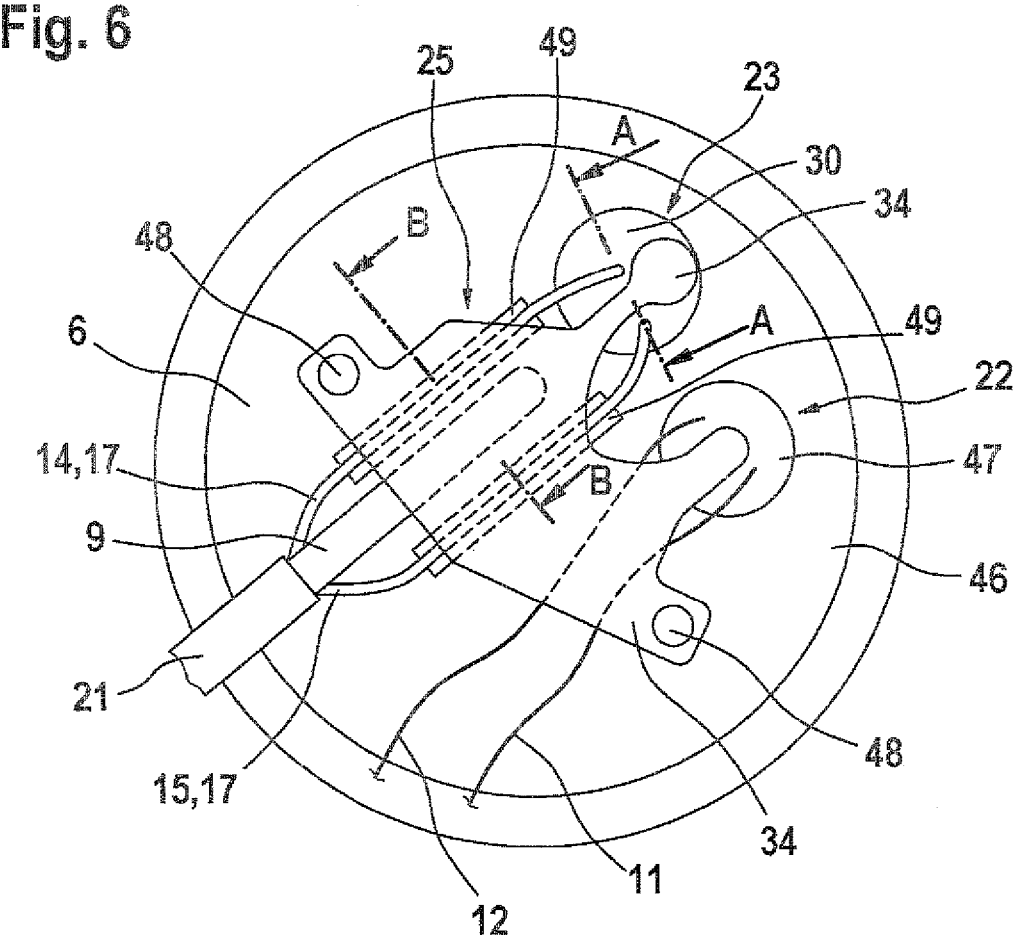
FIG. 6 shows an advantageous cover in a plan view.

FIG. 6 shows the cover 6 in a plan view on the underside 46; the cover 6 shown here is essentially equivalent to the exemplary embodiment of FIG. 2. In FIG. 6, the holding-down device 34 is shown in its entirety, and the holding-down device 34 cooperates with both the plug sealing stopper 30 of the line feedthrough 23 described in the foregoing drawings and with a plug sealing stopper 47 of the line feedthrough 24 which is designed in a corresponding way to the line feedthrough 23. The section line A-A defines the cross sections, shown in FIGS. 2-5, through the cover 6. The holding-down device 34 has two screw openings 48, by means of which the holding-down device 34 can be secured to the cover 6. Alternatively or in addition, the holding-down device 34 can also be secured to the cover 6 by means of detent elements. The section line B-B defines a cross section, shown in FIG. 7, through the cover 6, which will be described below.

Figure 7:
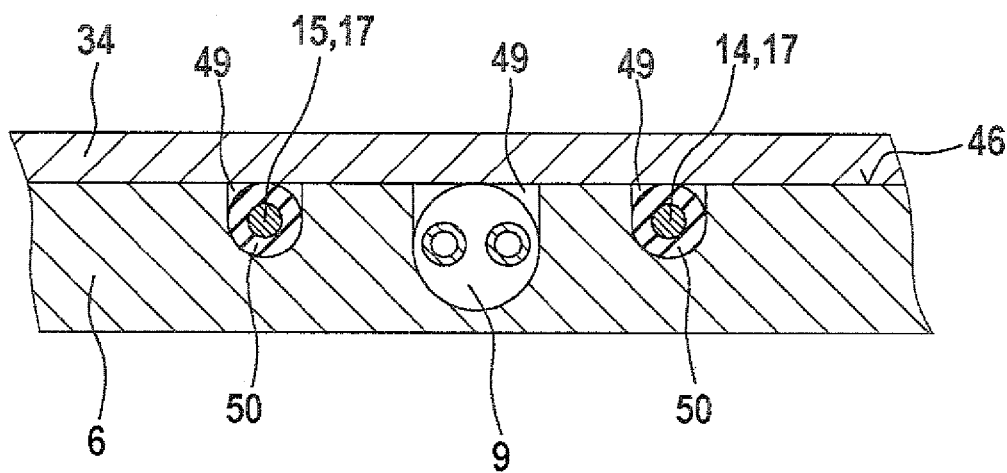
FIG. 7 shows a cross section through the cover.

FIG. 7 shows the cross section B-B through the cover 6, the holding-down device 34, and the electric lines 14, 15 and the hydraulic line 9. For each of the lines 14, 15, 9 parallel to one another, the cover 6 has a peripherally open, groovelike line receptacle 49, advantageously in the region of the dome 25, in each of which a line 14, 15 or 9 is located. The flexible special steel cords 17 in the present exemplary embodiment have an elastic sheath 50, in particular an elastomer sheath. As a result, a good, conductive contact is assured between the cover 6 and the respective flexible special steel cord 17, so that the heat generated by the flexible special steel cords 17 is transmitted especially advantageously to the suction line 9 via the cover 6. The holding-down device 34 rests on the lines 14, 15 and 9 here, so that they are clamped in the line receptacles 49. As a result, a tension relief for the lines 14, 15 and 9 is assured, which calms the lines 9, 14, 15 before they exit from the heating kettle 5 despite buckling of the frozen reducing agent in the beating kettle 5 that may occur upon freezing. The tension relief likewise forms a part of the line feedthrough 23.

All in all, by means of the advantageous embodiment of the line feedthroughs 23 and 24, a possibility is created of preassembling the entire heating train independently of the cover, thus reducing both production cost and production time, and furthermore the tightness of the reducing agent system or of the heating kettle 5 is durably assured.

The holding-down device and the cover can equally well be designed such that a tension relief for the electric lines 11, 12 is assured. Furthermore, the return path 22 is advantageously also disposed in the region of the dome 25, so that it too can be thawed by means of the flexible special steel cords 17.

The foregoing relates to the preferred exemplary embodiments of the invention, it being understood that other variants and embodiments thereof are possible within the spirit and scope of the invention, the latter being defined by the appended claims.

The invention claimed is:

1. A line feedthrough through a heating kettle cover of a heating kettle of a reducing agent tank, comprising:
    a heating kettle cover of the heating kettle;
    at least one line penetrating an opening in the heating kettle cover; and
    a sealing element sealing off the line in the opening,
    wherein the sealing element is an elastic plug sealing stopper, which is plugged sealingly into a receptacle associated with the heating kettle cover,
    wherein the receptacle is formed by an intermediate element disposed on the heating kettle cover, and
    wherein the intermediate element is acted upon by a holding-down device disposed on the cover.

2. The line feedthrough as defined by claim 1, wherein a sealing element is disposed between the intermediate element and the heating kettle cover.

3. The line feedthrough as defined by claim 1, wherein the plug sealing stopper has at least one plugging opening, in which the line is sealingly received.

4. The line feedthrough as defined by claim 1, wherein the plug sealing stopper has at least one clamping element with which the plug sealing stopper is securable to the line.

5. The line feedthrough as defined by claim 1, wherein the plug sealing stopper is vulcanized onto the line.

6. The line feedthrough as defined by claim 1, wherein the cover has at least one peripherally open, groove-like line receptacle, in which the line is located in at least some regions.

7. The line feedthrough as defined by claim 1, wherein the line has an elastic sheath.

8. The line feedthrough as defined by claim 1, wherein the line is held in the line receptacle by the holding-down device.

9. The line feedthrough as defined by claim 1, wherein the line is an electric line or a hydraulic line.

10. A cover for a heating kettle of a reducing agent tank, the kettle cover comprising:
    at least one line penetrating an opening in the kettle cover;
    a sealing element sealing off the line in the opening;
    at least one peripherally open, groove-like line receptacle in which the line is at least partially located; and
    at least one holding-down device is disposed on the cover, wherein
    the sealing element is an elastic plug sealing stopper sealingly inserted into a receptacle associated with the kettle cover, and
    the line is held in the line receptacle by the holding-down device.

11. The kettle cover as defined by claim 10, wherein the receptacle is formed by the kettle cover.

12. The kettle cover as defined by claim 10, wherein the receptacle is formed by an intermediate element disposed on the kettle cover.

13. The kettle cover as defined by claim 12, wherein a sealing element is disposed between the intermediate element and the heating kettle cover.

14. The kettle cover as defined by claim 10, wherein the plug sealing stopper has at least one plugging opening in which the line is sealingly received.

15. The kettle cover as defined by claim 10, wherein the plug sealing stopper has at least one clamping element with which the plug sealing stopper is securable to the line.

16. The kettle cover as defined by claim 10, wherein the plug sealing stopper is vulcanized onto the line.

17. The kettle cover as defined by claim 10, wherein the line has an elastic sheath.

18. The kettle cover as defined by claim 10, wherein the plug sealing stopper is acted on by the holding-down device.

19. The kettle cover as defined by claim 12, wherein the intermediate element is acted upon by a holding-down device disposed on the cover.

20. The kettle cover as defined by claim 10, wherein the line is an electric line or a hydraulic line.

* * * * *